2 Sheets—Sheet 1

W. H. ROBERTSON.
Starching-Machine.

No. 227,583. Patented May 11, 1880.

Witnesses:
Robt. J. Gaylord
T. E. Steele

Inventor:
W. H. Robertson
By W. E. Simonds
Atty

W. H. ROBERTSON.
Starching-Machine.

No. 227,583.  Patented May 11, 1880.

2 Sheets—Sheet 2.

Witnesses:
Robt. T. Gaylord
Lewis Sperry

Inventor:
W. H. Robertson
By W. E. Simonds
Atty

UNITED STATES PATENT OFFICE.

WILLIAM H. ROBERTSON, OF HARTFORD, CONNECTICUT.

STARCHING-MACHINE.

SPECIFICATION forming part of Letters Patent No. 227,583, dated May 11, 1880.

Application filed February 4, 1880.

*To all whom it may concern:*

Be it known that I, WM. H. ROBERTSON, of Hartford, in the county of Hartford and State of Connecticut, have invented certain new and useful Improvements in Starching-Machines, of which the following is a description, reference being had to the accompanying drawings, where—

Figure 1:
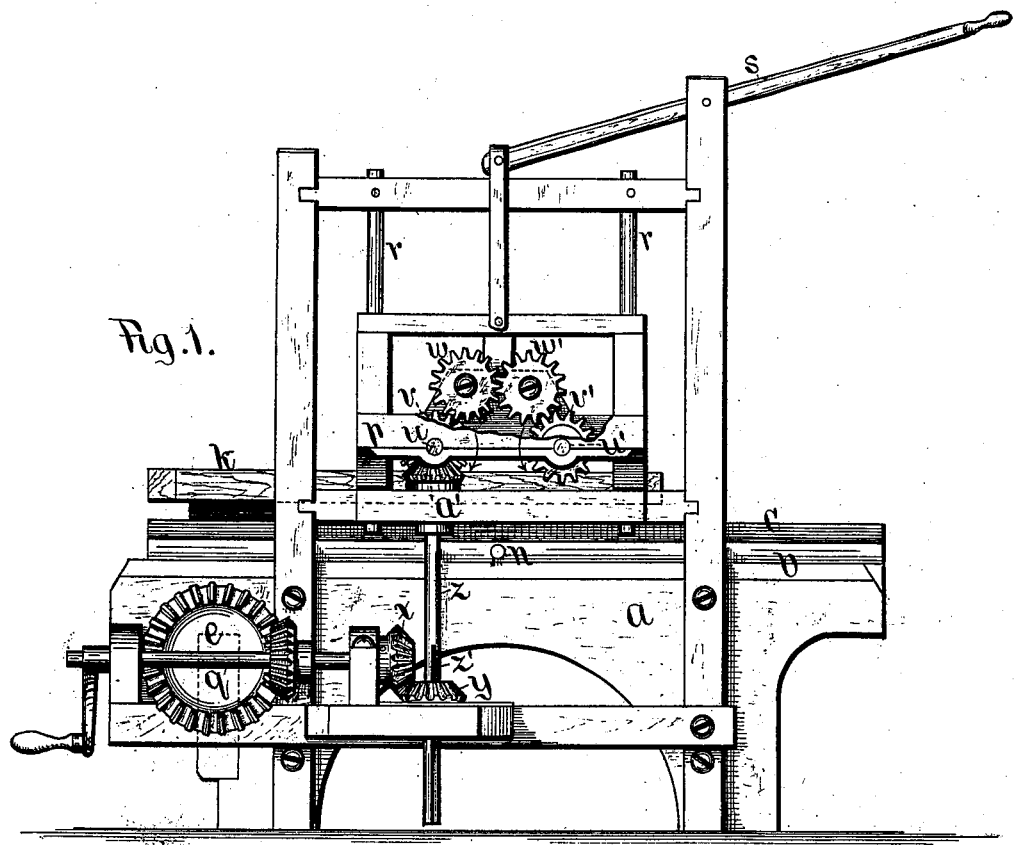
Figure 2:
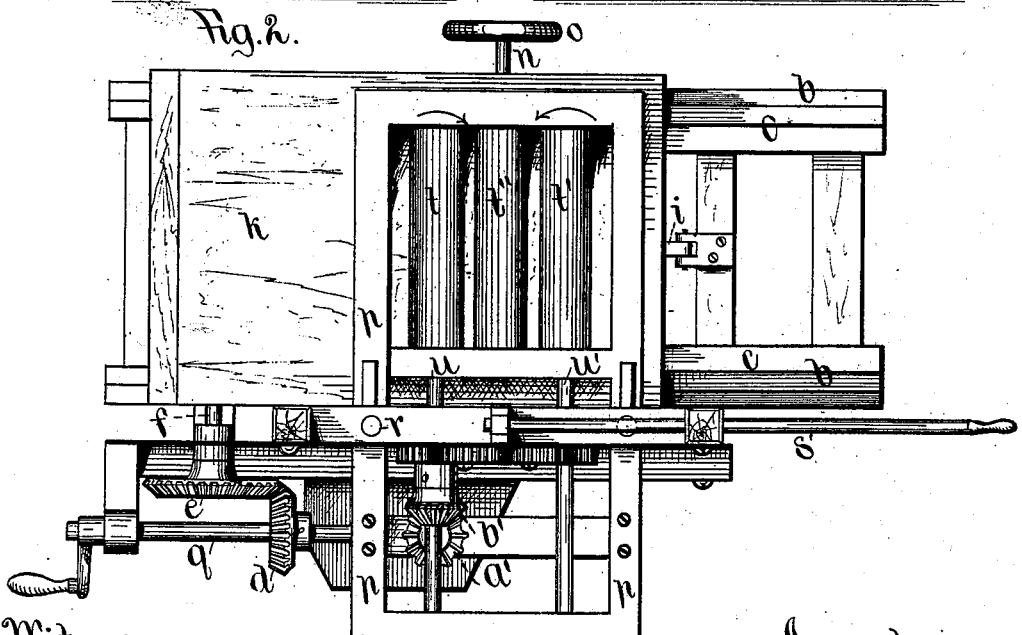
Figure 3:
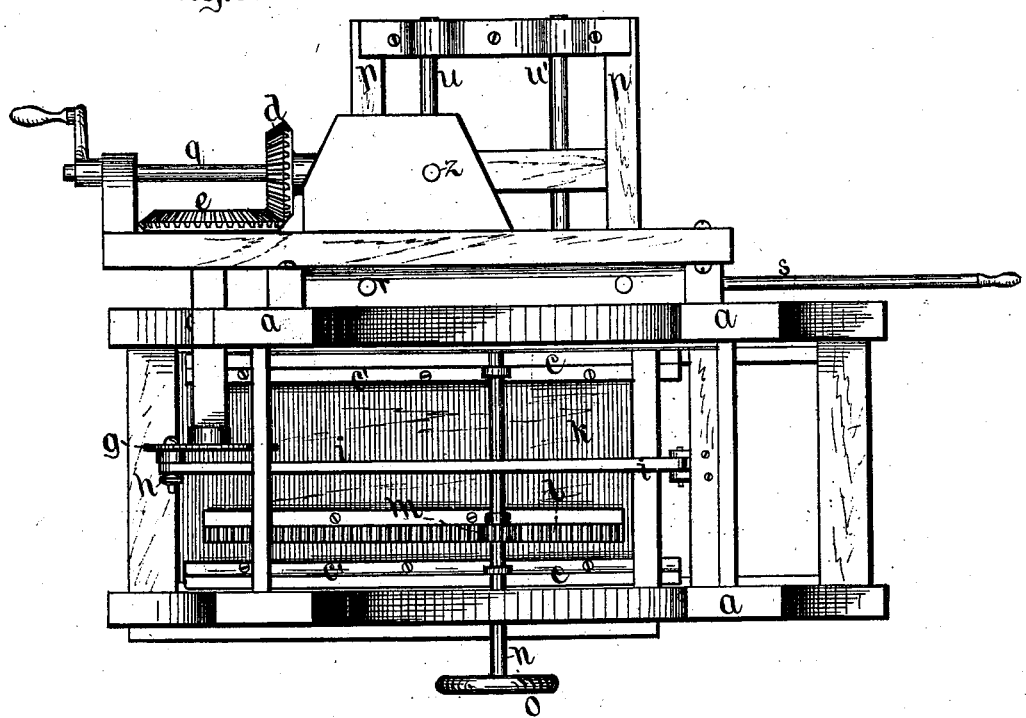
Figure 4:
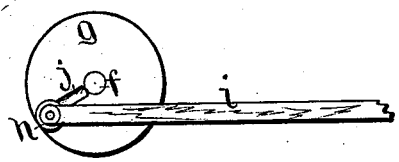

Figure 1 is a side elevation of a machine embodying my improvements. Fig. 2 is a top view of same. Fig. 3 is a bottom view of same. Fig. 4 is a detail view of a crank-pin disk made use of.

The invention relates to a machine or apparatus for working starch into collars, cuffs, and other articles which need starching.

The letter $a$ denotes the main frame of the machine, provided with ways $b\ b$, on which rests a reciprocating frame or bed, $c$, having its reciprocation given from the rotation of the main shaft $q$ through pinion $d$, meshing into gear $e$, fast on shaft $f$, carrying disk $g$, with its crank-pin $h$, from which pitman $i$ runs to reciprocating bed $c$. The crank-pin is radially adjustable in the slot $i$, in disk $g$, whereby the length of the reciprocating movement of the bed $c$ may be governed.

The bed $c$ itself carries ways $c'\ c'$, on which rests the table $k$, on the under side of which is the rack $l$, meshing into the pinion $m$ fast on shaft $n$, hung in bed $c$, on the outer end of which is a wheel, $o$, whereby to rotate shaft $n$. This arrangement allows the table $k$ to reciprocate with the bed $c$, and at the same time to be longitudinally adjustable thereon.

The letter $p$ denotes a roller-frame, having at proper and desired times vertical movement on the guide-rods $r$, such vertical movement being given by manipulating the lever $s$. This vertical movement of the roller-frame is for the purpose of permitting the rollers which the frame carries to be lifted off the table $k$.

The roller-frame carries two rotated rollers, $t\ t'$, which rotate in opposite directions, as denoted by their respective overlying arrows, to effect which the shafts $u\ u'$, which carry these rollers, may be geared directly together, or, preferably, the gears $v\ v'$ may be geared together by means of the intermediate gears $w\ w'$. The roller-shafts are rotated from the main axle $q$, by means of the bevel-gear $x$ meshing into bevel-gear $y$, rotarily fast on shaft $z$, carrying bevel-gear $a'$, meshing into bevel-gear $b'$, fast on roller-shaft $u$. In order to allow shaft $z$ to move up and down with the roller-frame, and yet rotate with the gear $y$, a spline is carried on the inside of gear $y$, fitting to a slot, $z'$, made in shaft $z$.

The rotation of the rollers $t\ t'$ in opposite directions, as denoted by the overlying arrows, is a matter of essence. When both are working on a piece of goods they tend to act against each other and so hold the goods from being drawn by their action in either direction. They also prevent the corners of the goods from being curled up.

Intermediate between the rollers $t\ t'$ is a loose roller, $t''$, which helps to hold the goods to the table at all times, and which is specially useful when, on account of the progress of the table, one of the rollers $t\ t'$ has lost its hold on the goods.

In using this machine the starch is applied either to the goods or the rollers or both. The movement which the table has upon the bed $c$ allows work to be arranged for the rollers upon one end of the table while the rollers are actually at work at the other end of the table. The rollers are covered with rubber.

I claim as my invention—

1. The combination of the table $k$ with the rotated rollers $t\ t'$, rotating in opposite directions, substantially as shown and described.

2. The combination of the table $k$ with the rotated rollers $t\ t'$, rotating in opposite directions, and with the intermediate loose roller $t''$, substantially as shown and described.

3. In combination, shaft $q$, gear $x$, spline-carrying gear $y$, grooved shaft $z$, gears $a'\ b'$, roller-carrying shafts $u\ u'$, and gears $v\ v'\ w\ w'$, guide-rods $r$, roller-frame $p$, lever $s$, pinion $d$, gear $e$, shaft $f$, crank-pin disk $g$, pitman $i$, reciprocating bed $c$, shaft $n$ and pinion $m$, rack $l$, and table $k$, all substantially as shown and described.

WM. H. ROBERTSON.

Witnesses:
ROBT. F. GAYLORD,
WM. E. SIMONDS.